Patented June 17, 1947

2,422,206

UNITED STATES PATENT OFFICE 2,422,206

METHOD OF PREPARING COMPOSITION OF MATTER SUITABLE FOR USE AS A LUBRICANT AND AS AN ADDITION AGENT TO LUBRICANTS

John M. Musselman, South Euclid, Ohio, assignor to The Standard Oil Company, Cleveland, Ohio, a corporation of Ohio No Drawing. Application July 25, 1944, Serial No. 546,566

12 Claims. (Cl. 252—46.4)

This invention relates to an improvement in a process for making a composition of matter suitable for use as a lubricant per se and as an additive for oils and greases to improve their lubricating properties. More particularly, the invention relates to an improved method of making an additive for lubricating mineral oils.

In my Patent No. 2,331,923, granted October 19, 1943, I have disclosed a process in which a wax, such as degras, is reacted with a sulfide of phosphorus, such as $P_2S_5$, following which the reaction product may be separated from a by-product residue and used as such or may be converted to the corresponding basic compound thereof, for example, the corresponding calcium salt or soap.

The reaction product of the wax and the $P_2S_5$, as well as the basic compounds thereof, may be incorporated in oils and other lubricants of various types and in varying amounts to prevent breakdown of the lubricant, thereby minimizing the formation of acid and sludge and maintaining a good condition in the motor in which the treated lubricants are used.

A further consideration of the reaction between the wax and the $P_2S_5$ has led me to conclude that a phosphorus oxide, probably $P_2O_5$, is a by-product of the reaction, and results from the replacement of oxygen in the wax by sulfur and a combination of the replaced oxygen with the phosphorus of the phosphorus pentasulfide.

I perceive that this phosphorus oxide by-product may act as a catalyst during the reaction, and as its content increases towards the end of the reaction, it probably exerts a polymerizing effect upon any unreacted wax or upon the wax-$P_2S_5$ reaction product, whereby an amount of the raw material or the reaction product is polymerized and separates with the by-product residue or sludge.

In carrying out this prior process on a commercial scale a considerable amount of the residue forms in the initial reaction between the wax and the $P_2S_5$ and the yield of the reaction product is not as high as desired for a full utilization of the materials. While carefully controlled laboratory operations give better yields, plant operations using large quantities of commercially available crude raw materials under poorer conditions of control leave much to be desired in the way of yields.

These lower yields may be attributed in part to the fact that the reaction is exothermic, and that it is difficult to dissipate the heat formed by a large amount of the reacants in a large kettle. This difficulty often makes it necessary to operate at a temperature somewhat higher than the optimum temperature, or to continue the reaction for a time longer than the optimum, or both, neither of which are conducive to good yields.

It is an object of the invention to carry out the reaction between a sulfide of phosphorus and an oxygen-containing raw material, such as an ester type wax, under conditions to improve the yield of the reaction product.

It is a further object of the invention to carry out said reaction under conditions such that any phosphorus oxide by-product is diluted to such an extent that the polymerizing effect thereof is greatly minimized.

It is also an object of the invention to carry out the process under conditions such that the heat of the exothermic reaction may be absorbed at least in part or more evenly distributed.

More particularly, it is an object of the invention to carry out the reaction between the phosphorus sulfide and an oxygen-containing raw material, such as raw neutral degras, in admixture with an inert mineral oil with which the product is to be eventually incorporated.

An additional object of the invention is the inclusion of the mineral oil diluent during the reaction to lower the viscosity of the mixture and permit the separation of the by-product sludge in a shorter time and with greater completeness.

Still a further object of the invention is the use of a mineral oil diluent as above described to achieve more uniform control of the temperature during the reaction resulting in a more uniform product and contributing to the improved yield.

Still a further object is the provision of a process by which improved yields are obtained without detracting in any way from the properties of the composition of matter produced by the new process. The inclusion of the mineral oil diluent during the reaction is not objectionable insofar as the final product is concerned, inasmuch as the final reaction product of the prior art generally has been diluted with an amount of a mineral oil to provide a mixture of the reaction product in the oil, even when the reaction product is to be marketed as a concentrate for addition to lubricating oil.

In carrying out the reaction between the phosphorus sulfide and the oxygen-containing raw material in accordance with the process of the invention the temperature should be above the temperature for thiophosphate formation. It is well known that at lower temperatures the reaction of oxygen-containing compounds with a sulfide of phosphorus results in the formation of thiophosphates apparently with the inclusion of both the phosphorus and the sulfur in the final reaction product. By use of higher temperatures, in accordance with the process of the invention, a minimum amount of phosphorus enters into the reaction product and it also contains a minimum of oxygen. This is apparent in view of the above explanation that the phosphorus is thought to combine with the oxygen in the oxygen-containing raw material and to separate in a sludge, probably in the form of an oxide of phosphorus. This is not meant to say that when the invention is practiced on a commercial scale the reaction product will not contain any phosphorus and oxygen, and it may contain as high as about 2% each of phosphorus and oxygen. Generally the amounts are much less. This amount of oxygen is far less, however, than the oxygen content of the original reacting raw material and is far less than the oxygen content of a true thiophosphate. Similarly this amount of phosphorus is far less than would be present if all of the phosphorus of the phosphorus sulfide combined with the oxygen-containing starting material, such as would be the case in the formation of true thiophosphates.

The temperature may vary somewhat depending upon the molecular weight of the oxygen-containing raw material, its chemical configuration and the rate of the reaction desired. The lower temperature limit in any case may be determined readily by analysis of the reaction product to determine if it is a thiophosphate. If it is, the temperature that has been employed is too low to make the wanted type of reaction product. In view of the many variables involved it is difficult to assign reaction temperatures in numerical terms, that is, the optimum value for all of the different oxygen-containing raw materials that may be used in practicing the process, but in general the temperature should be above 270° F. and preferably within the range of 290° to 310° F. Temperatures within the range of 350° to 400° F. are not required in order that the reaction may proceed at a reasonable rate. Since the use of higher temperatures requires more accurate control, and since additional heat losses result through radiation, there is no advantage in using a higher temperature than is necessary.

Another important consideration is the amount of the phosphorus sulfide, and in general this should be at least about equivalent to the theoretical quantity required for the replacement of all of the oxygen in the oxygen-containing raw material by sulfur from the phosphorus sulfide. Since the atomic weight of sulfur is just double that of oxygen it is desirable to use an amount of phosphorus sulfide such that the weight of the sulfur therein is about double the weight of the oxygen in the oxygen-containing raw material. The amount can be readily determined by simple chemical calculations if the oxygen-containing raw material is a true chemical compound, or by an analysis of the oxygen contained therein if it is a mixture.

A small excess of a theoretical amount of the phosphorus sulfide, for example, not materially in excess of 10%, may be of assistance in forcing the reaction to completion. There is no point in using more, since it wastes the phosphorus sulfide. It is also likely that a part of any additional excess may remain dissolved in the reaction product and there appears to be little advantage in the inclusion of phosphorus and sulfur in the reaction product in this form.

The phosphorus sulfide to be used, preferably is phosphorus pentasulfide, since this is readily available commercially and the reaction proceeds well with it. Any other phosphorus sulfide may be used, however, for example, phosphorus sesquisulfide.

The process is applicable to a wide variety of oxygen-containing organic compounds or mixtures thereof as the raw material. Preferably these raw materials should have a boiling point above the reaction temperature in order to maintain them in the liquid or solid form in the reaction phase without the use of pressure. If the reaction temperature is the minimum, i. e., about 270° F., this would be the minimum boiling point for the organic oxygen-containing raw material. Generally the raw material should have a boiling point of at least 300° F.

Included in the various oxygen-containing materials are alcohols, for example, lauryl alcohol, stearyl alcohol and oleyl alcohol as illustrative of the monoatomic alcohols, and various glycols and glycol polymers as illustrative of the polyatomic alcohols. Phenols and cyclic alcohols are additional examples.

Organic acids may be used such as the saturated and unsaturated fatty acids, i. e., caproic, myristic, palmitic and stearic, and higher molecular weight fatty acids, also oleic and unsaturated fatty acids. Polybasic acids are additional examples. The various naphthenic and cyclic acids, such as acids derived from mineral oils may be used and also aromatic acids, such as naphthalic, benzoic and naphthoic acids.

The process is applicable to esters, for example, fatty acid esters of monoatomic alcohols. In this group are contained the ester type waxes which are particularly adapted for use as the raw material. Examples are degras, lanolin, beeswax, sperm oil, carnauba wax, Japan wax, Chinese wax, spermaceti, whale oil and the like. These naturally occurring waxes are rich in the fatty acid esters of monoatomic alcohols although they may include other compounds. Also there may be used in accordance with the invention fatty acid esters of monoatomic alcohols having a lesser total number of carbon atoms than is generally contained in the waxes. For example, methyl, ethyl, propyl and butyl palmitates, oleates, stearates, cetyl, stearyl or oleyl propionates or butyrates; and esters in which both the acid and alcohol radical are intermediate molecular weights, such as octyl caproate. Esters of fatty acid esters of polyatomic alcohols, such as glycols and glycerol may be used. In the latter group is contained the wide variety of naturally occurring animal and vegetable oils and fats such as tallow, palm oil, etc.

Other organic oxygen-containing compounds include the ketones, aldehydes and ethers of sufficiently high molecular weight to have the requisite boiling point.

Any of the above mentioned compounds may be of the substituted type, such as the halogenated compounds, illustrative of which are chlorobenzoic acid, dichlorostearic acid, methyldichlorostearate, methylchloronaphthenate and dichlorobenzoic acid; also hydroxy substituted compounds, such as hydroxystearic acid, dihydroxybenzoic acid, hydroxynaphthenic acid, dihydroxystearic acid and dichlorodihydroxystearic acid. The organic compounds may be derived from a mineral source such as fatty acids from petroleum and oxidized petroleum fatty acids, oxidized oils, such as used crank case oil containing a substantial amount of oxygen-containing compounds.

Any of the above compounds may be used in admixture with each other or in admixture with other compounds in which the oxygen-containing compound is the predominant ingredient of the mixture.

Preferably the compound or mixture thereof should not be too unsaturated. The compounds of an iodine value over about 25 to 50 give somewhat lower yields because of their tendency to polymerize more readily. However, this is not so important a consideration in accordance with the invention since highly unsaturated compounds which would be unsuitable for the prior process can be used to obtain reasonable yields in accordance with the invention because of the conditions minimizing polymerization. If desired, the iodine value of any of the compounds may be reduced by hydrogenation.

The process of the invention will be described as illustrated by the preparation of the reaction product of degras and phosphorus pentasulfide.

In accordance with the illustrative example of the improved process, 1000 pounds of degras is mixed with 1000 pounds of a mineral lubricating oil of the type in which the additive is to be eventually used. The mixture is placed in a large kettle equipped with an agitator and preferably with heating and cooling coils. To this mixture is added gradually 230 pounds of $P_2S_5$. The reaction is exothermic and it is desirable to add the $P_2S_5$ in increments at such a rate that a temperature of about 300° F. is maintained. The presence of the oil aids in controlling the temperature since the oil absorbs part of the heat generated and helps to prevent spasmodic or runaway temperature changes. If desired the mixture of degras and mineral oil may be heated to an initial temperature of about 250° F. before the first increment of $P_2S_5$ is added. The time over which the $P_2S_5$ is added may be shortened by cooling the mixture, such as by circulating cold water in the cooling coils. Generally this expedient need not be utilized and the $P_2S_5$ may be added stepwise so as to maintain the reaction temperature within the range of about 290 to 310° F. After the reaction is complete, which takes several hours, the agitation is stopped and the mixture is permitted to settle during which time the sludge separates in the bottom of the kettle and the reaction product may be drawn off from the top. Centrifugal separation may be utilized to speed the separation but this is not essential since the presence of the oil lowers the viscosity and permits settling in a reasonable time.

The following tabulation summarizes the details of the improved process and the yields obtained thereby as compared with the prior art process in which the degras is not diluted with mineral oil:

| | Improved Process | Regular Process |
|---|---|---|
| Weight of degras charged...........pounds.. | 1,000 | 1,000 |
| Weight of oil added....................do.... | 1,000 | 0 |
| Weight of $P_2S_5$......................do.... | 230 | 230 |
| Reaction temperature...................° F.. | 300 | 300 |
| Reaction time......................hours.. | 2 | 2 |
| Setting time........................do.... | 16 | 16 |
| Weight of sludge formed............pounds.. | 414 | 550 |
| Weight of reaction product (including oil) do.... | 1,816 | 680 |
| Oil in reaction product................do.... | 1,000 | 0 |
| Net amount of reaction product.........do.... | 816 | 680 |
| Yield of reaction product based on degras percent.. | 81.6 | 68 |
| Chemical analysis based on pure reaction product: | | |
| Amount of sulfur..................percent.. | 11.0 | 11.0 |
| Acid number.............................. | 20.0 | 20.0 |

The above separated reaction product may be used as such as an additive for lubricating oils in varying amounts.

The amount of the mineral oil diluent which is to be included during the reaction may vary from that disclosed in the above example. The minimum is that which gives some substantial improvement in yield, otherwise there is no point in using the oil. The lower limit is probably about 10% oil based on the amount of the oxygen-containing raw material; noticeable improvements are obtained when the amount of oil is 25 to 50% of the oxygen-containing raw material. The improvement obtained with 100% oil is noted in the above example. The maximum amount of oil is governed by the minimum of the additive to be included in the mineral oil under the conditions of use. For example, if the final additive is to be used in the oil in an amount of 5%, the reaction mixture may contain at a maximum about 19 parts of oil to 1 part of the oxygen-containing raw material. When such large amounts are used it is necessary to handle a greater bulk of oil and the inconvenience of doing this together with the additional heat required suggests that the optimum range will probably be about 50 to 200% of oil based on the oxygen-containing raw material.

The separated reaction product may be converted into the corresponding basic compound which may be of an organic nature, such as an amine, an alkylolamine, pyridine or any other compound generally recognized in the class of organic bases; or the basic compound may be metallic in origin such as a metal oxide or hydroxide. These metals may be an alkali metal such as potassium or sodium, or an alkaline earth metal such as calcium, barium or magnesium. The metal also may be aluminum or metals lower than aluminum in the electromotive series, such as chromium, cadmium, cobalt, antimony, bismuth, zinc, tin, arsenic, mercury, etc.

The metal should be selected with reference to the use for the composition and the properties desired in it. For example, metals which are known to have a pro-oxygenic effect, such as iron and copper, may be used in making additives for gear box greases, but preferably not in additives for lubricants for internal combustion engines operating at high temperatures where pro-oxygenic conditions are exaggerated. The alkali metals have emulsifying characteristics; the alkaline earth metals have excellent detergent characteristics; and the heavier metals have desirable surface inhibition characteristics.

A plurality of metals may be used when the composition is to have the different properties imparted by the different metals, such as calcium and barium; or one of them with a heavier metal, such as arsenic, tin or zinc; or potassium or sodium with an alkaline earth metal and/or any of the so-called heavier metals.

The amount of the basic compound to be employed will depend largely upon the molecular weight of the basic compound and the acid number of the reaction product. If a truly neutral additive is wanted the amount should be sufficient to reduce the acid number to zero. Generally this amount will vary from 1 to 15% depending upon the factors mentioned. The amount also will depend upon whether the reaction product is to be completely or only partially saponified or neutralized. If desired the amount of the basic compound may be such as to reduce the acid number from 20; for example, to 10 rather than to 0. This will leave the final product as a mixture of the initial unsaponified reaction product and the basic compound thereof. Such a mixture is advantageous under some circumstances since it may embody the emulsifying, detergent, or inhibiting features of the various saponified products together with the effect of the polar groups in the unsaponified portions.

In the case of a mixture of two or more of the metals in either a completely or partially saponified product, I am not certain if both of the metals chemically combine in a single molecule of the reaction product or if the saponified additive comprises a mixture in which the two different metals are in different molecules. However, either possibility is intended to be covered and included within my description of a plural metal compound of the reaction product.

In the case of certain heavier metals the oxides or hydroxides of which are less reactive it may be desirable first to convert the initial reaction product to the alkali metal compound thereof and this may then be reacted with the salt of the desired higher metal to replace the alkaline metal. If desired only a part of the alkali metal may be replaced by the heavier metal and this affords an easy way to obtain a dual metal compound of an alkali or alkaline earth metal with a heavier metal.

As illustrative of such a basic compound, the above described reaction product of degras-$P_2S_5$, is saponified with 3% of lime hydrate and 12% of barium hydrate by weight based upon the amount of the reaction product present. The saponification is carried out at a temperature of about 175° to 200° F., preferably about 180° F. by agitating the reaction product (diluted in the mineral oil) with the above named hydrates for a period of about 4 hours in the presence of water. Following this the temperature is raised to 250° F. to dry out the product. Preferably the lime and barium hydrates are added slowly so as not to cause undue heat generation which results in foaming and the loss of water due to temperature rise. Alternatively the reaction may be carried in a pressure vessel at a temperature above the boiling point of water and under pressure so as to retain the water present until the saponification action is complete.

The barium and lime compound of the reaction product made in accordance with the above specific example was analyzed chemically and compared with the same reaction product made by the regular process.

| Chemical Composition | Improved Process | Regular Process |
|---|---|---|
| Sulfur_____per cent__ | 5 | 5 |
| Ash (as sulfate)_____do____ | 5 | 5 |
| Viscosity 210 S. S. U_____ | 100 | 100 |
| Acid number_____ | 0.25 | 0.25 |

The above composition, comprising the barium-lime compound of the reaction product prepared in accordance with the above specific example and the mineral oil, was added to a Mid-Continent S. A. E. 30 lubricating oil in an amount of 12% and compared with the same oil containing the additive prepared in accordance with the prior art process and in an amount to achieve the same amount of the additive in the oil. The two oils were tested in an ethyl motor under procedure IV and the conditions of the test are as follows:

Speed_____ 1200 R. P. M.
Jacket temperature_____ 212° F.
Sump temperature_____ 300° F.
Air-fuel ratio_____ 15:1
Compression ratio_____ 7:1
Fuel _____ Gasoline (X-70)
Catalyst_____ 0.1% $Fe_2O_3$ as Neodex iron naphthenate
Running time_____ 16 hrs.

The data from the test are as follows:

| | Oil Without Additive | Oil With Additive made by Improved Process | Oil With Additive made by Regular Process |
|---|---|---|---|
| Sludge_____per cent__ | 6.0 | 0.15 | 0.30 |
| Acid Number_____ | 4.5 | 2.0 | 2.5 |
| Viscosity Index S. S. U_____ | 600.0 | 60 | 42 |
| Skirt Number_____ | 8.0 | 0.0 | 0.0 |
| Demerit Rating_____ | 24.5 | 2.75 | 3.20 |

From the above it will be seen that the product made in accordance with the improved process of the invention is fully equal, if not superior, to the product made by the regular process, thereby demonstrating that the improved yield is not accompanied by any reduction in the improved properties of the additive.

The amount of the initial reaction product, or the basic compound thereof, which may be added to an oil or grease may vary depending upon its characteristics and the use for which it is intended. Some oils have more of a tendency to form acid and sludge than others, depending upon their origin and constitution, and these oils may require a larger amount of the additive. Oils that are intended for high temperature uses may require larger amounts of the additive. In general, the range is from 1 to 15% of the true reaction product or basic compound thereof, but under some circumstances amounts as low as 0.1% show a remarkable improvement. Inasmuch as the additive itself is a lubricant there is no upper limit to the amount that may be added to the oil. Since the invention is concerned with the process of making the additive, rather than the additive itself, it is believed unnecessary to describe further the properties and uses of the additive in order that the process of the invention may be understood.

The mineral oil included as a diluent during the reaction possibly may be benefited by the contact with the phosphorus sulfide and if so this represents an additional benefit from the process which may be significant, especially when a relatively large portion of the ultimate amount of oil in which the additive is to be used is initially mixed with the oxygen-containing raw material.

It will be obvious to one skilled in the art that a wide variety of materials fall within the group defined generically herein and that various processing procedures may be adopted in accordance with the invention. For example, the heat also may be dissipated in part by more efficient cooling coils in the reaction kettle. This could also be accomplished by carrying out the reaction in an inert solvent, such as a hydrocarbon boiling at the desired temperature so as to absorb the heat by the vaporization of the solvent which could be condensed and returned. It is believed unnecessary to lengthen the specification with additional examples since the scope of the invention and the method of practicing it as set forth in the following claims may be fully understood from the description heretofore.

I claim:

1. In a process of forming a composition of matter suitable for use as a lubricant and as an additive for mineral oils to improve their lubricating properties, in which process a phosphorus sulfide is reacted at a temperature of at least about 270° F. with an ester type wax, and in which process the amount of the phosphorus sulfide is at least about the amount required to complete the reaction that occurs at said temperature, the improvement which comprises carrying out said reaction while the reacting ingredients are diluted with at least about 10% of a mineral oil to improve the yield of the reaction product and minimize the formation of a phosphorus and oxygen-containing by-product.

2. In a process of forming a composition of matter suitable for use as a lubricant and as an additive for mineral oils to improve their lubricating properties, in which process a phosphorus sulfide is reacted at a temperature of at least about 270° F. with an ester type wax, and in which process the amount of the phosphorus sulfide is at least about the amount required to complete the reaction that occurs at said temperature, the improvement which comprises carrying out said reaction while the reacting ingredients are diluted in 50 to 200% of a mineral oil to improve the yield of a reaction product and minimize the formation of a phosphorus and oxygen-containing by-product.

3. In a process of forming a composition of matter adapted to be added to a mineral lubricating oil to improve the lubricating properties thereof, and in which process phosphorus pentasulfide is reacted at a temperature of at least about 270° F. with an ester type wax, and in which process the amount of the phosphorus pentasulfide is at least about the amount required to complete the reaction that occurs at said temperature, the improvement which comprises mixing said wax with at least about 10% of a mineral lubricating oil of the same general type as that with which the additive is to be used, and then reacting said wax with the phosphorus pentasulfide while in admixture with the mineral oil, whereby improvements in the yield of the reaction product is obtained and the formation of a phosphorus and oxygen-containing by-product is minimized.

4. A process of forming a composition of matter suitable for use as a lubricant and as an additive for mineral oils to improve their lubricating properties, which comprises reacting a phosphorus sulfide at a temperature of at least about 270° F. with an ester type wax while in admixture with at least about 10% of a mineral lubricating oil, the amount of the phosphorus sulfide being at least about the amount required to complete the reaction that occurs at said temperature, and while said reaction product is at least about 10% of admixture with the mineral oil, converting it to the corresponding salt thereof by reaction with a basic compound.

5. A process of forming a composition of matter suitable for use as a lubricant and as an additive for mineral oils to improve their lubricating properties, which process comprises reacting phosphorus pentasulfide at a temperature of at least about 270° F. with an ester type wax while in admixture with about 50 to 200% of a mineral lubricating oil, the amount of the phosphorus pentasulfide being at least about the amount required to complete the reaction that occurs at said temperature, and while said reaction product is in admixture with the mineral oil, converting it to the corresponding metallic salt thereof by reaction with a basic metallic compound.

6. In a process of forming a composition of matter adapted to be added to a mineral lubricating oil to improve the lubricating properties thereof, which comprises reacting phosphorus pentasulfide at a temperature of at least about 270° F. with an ester type wax while in admixture with about 50 to 200% of a mineral lubricating oil of the same general type as that with which the additive is to be used, the amount of the phosphorus pentasulfide being at least about the amount required to complete the reaction that occurs at said temperature, and while said reaction product is in admixture with the mineral oil, converting it to the corresponding metallic salt thereof by reaction with a basic compound comprising an alkaline earth hydroxide.

7. In a process of forming a composition of matter adapted to be added to a mineral lubricating oil to improve the lubricating properties thereof, and in which process degras is reacted at a temperature of about 300° F. with an amount of phosphorus pentasulfide that is required to complete the reaction that occurs at said temperature, the improvement which comprises mixing said degras with 50 to 200% of a mineral lubricating oil of the same general type as that with which the additive is to be used, and then reacting said degras with the above mentioned amount of phosphorus pentasulfide under said reaction conditions while in admixture with the mineral oil, whereby an improvement in the yield of the reaction product is obtained and the formation of a phosphorus and oxygen-containing by-product is minimized.

8. In a process of forming a composition of matter adapted to be added to a mineral lubricating oil to improve the lubricating properties thereof, and in which process degras is reacted for about two hours at a temperature of about 300° F. with about 23% of phosphorus pentasulfide, the improvement which comprises mixing said degras with about 100% of a mineral lubricating oil of the same general type as that with which the additive is to be used, and then reacting said degras with the above mentioned amount of phosphorus pentasulfide under said reaction conditions while in admixture with the mineral oil, whereby an improvement in the yield of the reaction product is obtained and the formation of a phosphorus and oxygen-containing by-product is minimized.

9. In a process of forming a composition of matter adapted to be added to a mineral lubricating oil to improve the lubricating properties thereof, and in which process degras is reacted at a temperature of about 300° F. with an amount of the phosphorus pentasulfide that is required to complete the reaction that occurs at said temperature, the improvement which comprises mixing said degras with 50 to 200% of a mineral lubricating oil of the same general type as that with which the additive is to be used, then reacting said degras with the above mentioned amount of phosphorus pentasulfide under said reaction conditions while in admixture with the mineral oil, whereby an improvement in the yield of the reaction product is obtained and the formation of a phosphorus and oxygen-containing by-product is minimized, and while said reaction product is in admixture with the mineral oil converting it to the corresponding salt thereof by reaction with a basic compound.

10. In a process of forming a composition of matter adapted to be added to a mineral lubricating oil to improve the lubricating properties thereof, and in which process degras is reacted for about two hours at a temperature of about 300° F. with about 23% of phosphorus pentasulfide, the improvement which comprises mixing said degras with about 100% of a mineral lubricating oil of the same general type as that with which the additive is to be used, and then reacting said degras with the above mentioned amount of phosphorus pentasulfide under said reaction conditions while in admixture with the mineral oil, whereby an improvement in the yield of the reaction product is obtained and the formation of a phosphorus and oxygen-containing by-product is minimized, and while said reaction product is in admixture with the mineral oil converting it to the corresponding metallic salt thereof by reaction with a basic metallic compound.

11. In a process of forming a composition of matter suitable for use as a lubricant and as an additive for mineral oils to improve their lubricating properties, in which process a phosphorus sulfide is reacted at a temperature of at least about 270° F. with an oxygen-containing compound which has a boiling point above said temperature and which will form a phosphorus and oxygen-containing sludge as a by-product under the reaction conditions, and in which process the amount of the phosphorus sulfide is at least about the amount required to complete the reaction that occurs at said temperature, the improvement which comprises carrying out said reaction while the reacting ingredients are diluted with at least about 10 percent of a mineral oil so as to minimize the formation of said phosphorus and oxygen-containing by-product and improve the yield of the reaction product.

12. In a process of forming a composition of matter suitable for use as a lubricant and as an additive for mineral oils to improve their lubricating properties, in which process a phosphorus sulfide is reacted at a temperature of at least about 270° F. with a higher fatty compound which will form a phosphorus and oxygen-containing sludge as a by-product under the reaction conditions, and in which process the amount of the phosphorus sulfide is at least about the amount required to complete the reaction that occurs at said temperature, the improvement which comprises carrying out said reaction while the reacting ingredients are diluted with at least about 10 per cent of a mineral oil so as to minimize the formation of said phosphorus and oxygen-containing by-product and improve the yield of the reaction product.

JOHN M. MUSSELMAN.

REFERENCES CITED

The following references are of record in the file of this patent:

UNITED STATES PATENTS

| Number | Name | Date |
|---|---|---|
| 2,357,211 | Lincoln et al. | Aug. 29, 1944 |
| 2,331,923 | Musselman | Oct. 19, 1943 |
| 2,316,085 | Kelso | Apr. 6, 1943 |
| 2,357,346 | Musselman et al | Sept. 5, 1944 |